United States Patent [19]

Gimby

[11] Patent Number: 5,244,022
[45] Date of Patent: Sep. 14, 1993

[54] FUEL FLOW ACTIVATED FUEL VAPOR CONTROL APPARATUS

[75] Inventor: David R. Gimby, Livonia, Mich.

[73] Assignee: Borg-Warner Automotive, Inc., Sterling Heights, Mich.

[21] Appl. No.: 951,505

[22] Filed: Sep. 25, 1992

[51] Int. Cl.[5] .................... B65B 1/04; B65B 3/04
[52] U.S. Cl. .......................... 141/301; 141/45; 141/50; 141/302; 220/86.2; 137/587
[58] Field of Search .................. 141/44, 45, 46, 47, 141/50, 52, 53, 54, 59, 286, 290, 301, 302, 305, 307, 309, 325, 326; 220/86.2, 203, 204, 4.15, 4.14, 746; 137/587, 502, 486, 497

[56] References Cited

U.S. PATENT DOCUMENTS

| | | | |
|---|---|---|---|
| 4,057,085 | 11/1977 | Shihabi | 141/301 |
| 4,256,151 | 3/1981 | Gunn | 141/301 |
| 5,054,508 | 10/1991 | Benjey | 220/86.2 |

*Primary Examiner*—Henry J. Recla
*Assistant Examiner*—Steven O. Douglas
*Attorney, Agent, or Firm*—Emch, Schaffer, Schaub

[57] ABSTRACT

An apparatus for controlling the routing of fuel vapor in an automotive fuel vapor recovery system that includes a pressure actuated control valve. A vent line extends between the tank and the mouth of the filler pipe of the fuel system. A venturi member located in the vent line includes a signal port in communication with the control valve. Vapor flows through the vent line and venturi creates a low pressure signal which operationally acts on the control valve.

9 Claims, 3 Drawing Sheets

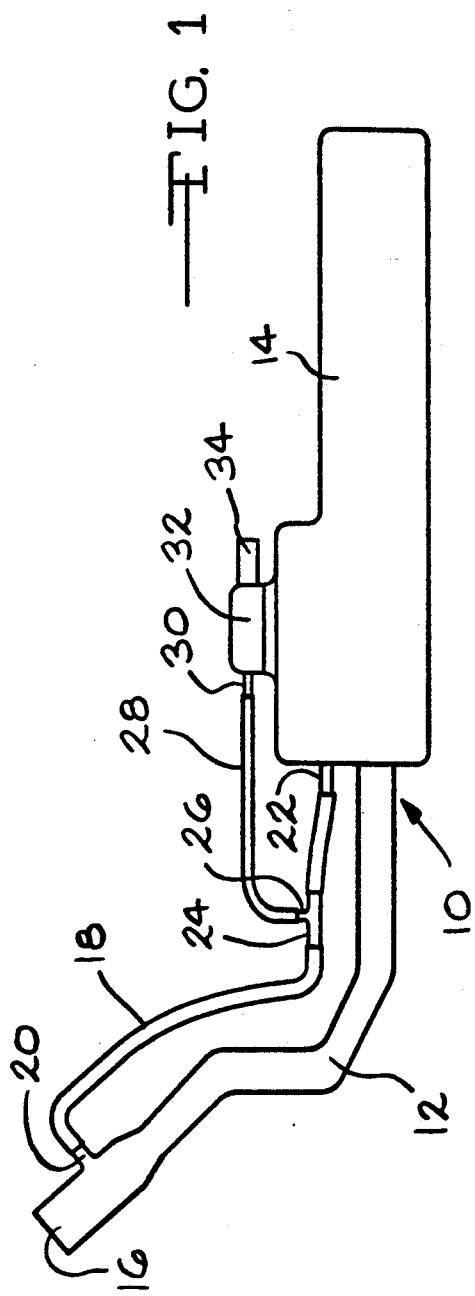
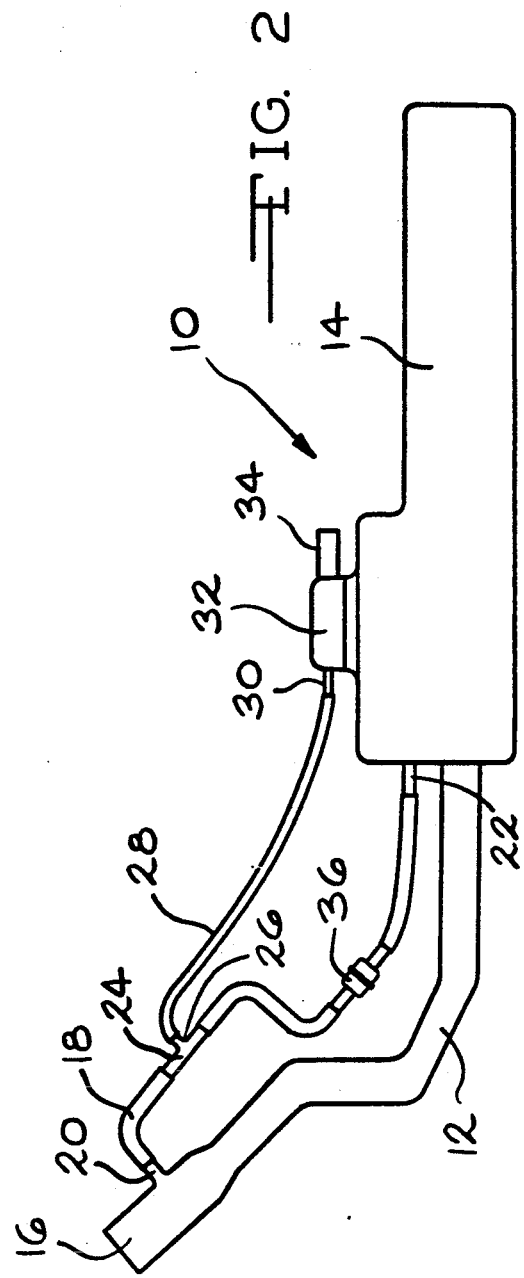

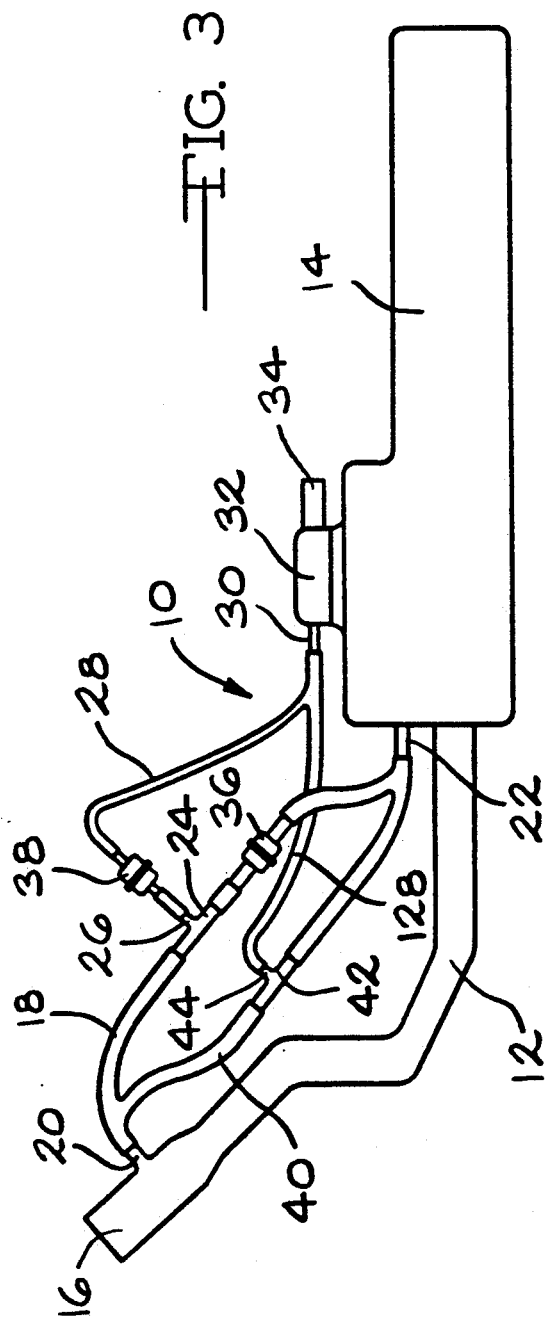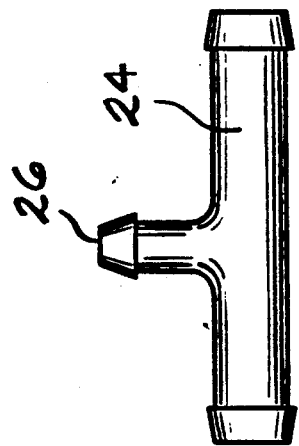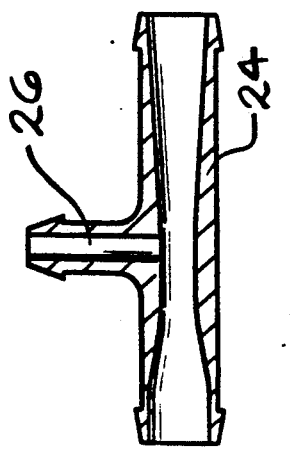

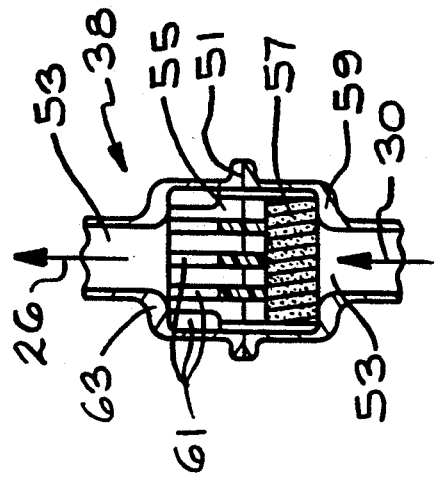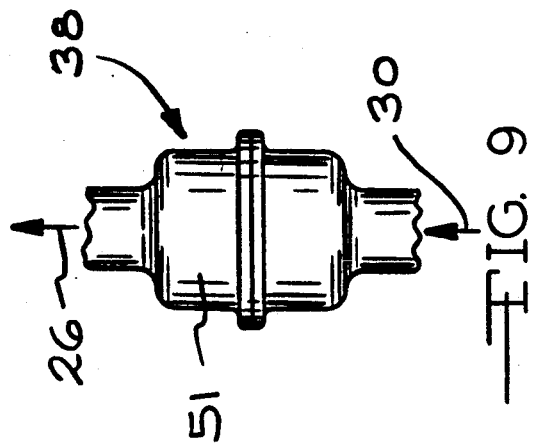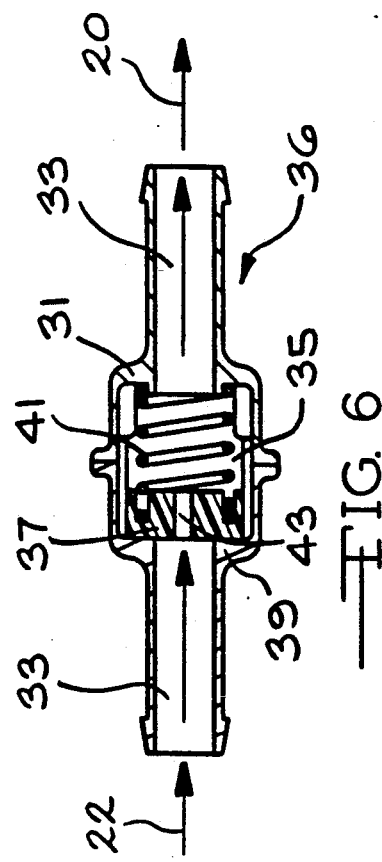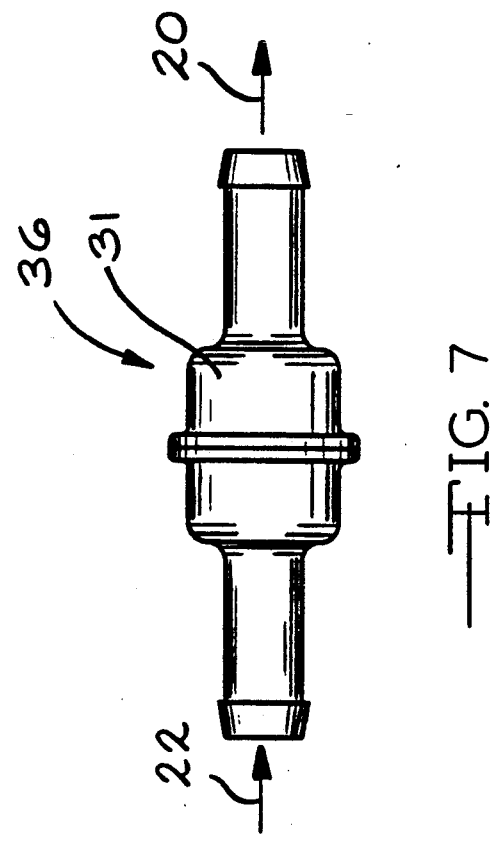

FUEL FLOW ACTIVATED FUEL VAPOR CONTROL APPARATUS

BACKGROUND OF THE INVENTION

The present invention relates to an apparatus for activating an on-board vapor recovery system which is designed to capture vapor emissions which may occur during the act of refueling and which may also occur as the result of running loss. Specifically, the purpose of the invention is to provide a vacuum or low pressure signal to a diaphragm actuated control valve which in turn will actuate a refueling vapor recovery system. This invention is particularly useful with the refueling vapor recovery system which is the subject of copending patent application Ser. No. 713,402 filed Jun. 10, 1991. The subject matter of the '402 patent application is expressly incorporated herein.

The capture of hydrocarbon vapor being expelled during the act of refueling and hydrocarbon vapor which is created during motor vehicle operations is a government mandated technology designed to ensure that no hydrocarbon vapor will be released to the atmosphere from the motor vehicle. Therefore, a primary concern in motor vehicle design is the ability to capture the hydrocarbon vapor being released from the fuel tank during the act of refueling and the fuel vapor released as the result of motor vehicle running loss. A variety of valves and vent systems, all designed to transmit fuel vapor to an appropriate storage container such as a carbon canister, have been designed and perform these stated objectives with varying degrees of efficiency. These system control valves are commonly designed to remain closed or to route fuel vapor to a separate storage canister, thereby providing and maintaining a certain vapor pressure within the fuel system. If the vapor pressure exceeds a given level, the relief valves are designed to open and expel the buildup of fuel vapor within the tank system. Usually the signal to open the relief valve comes from a control mechanism, responsive to high pressure, which can be separate from the relief valve or made a part thereof. Such control mechanisms commonly comprise the use of mechanical switches, seals, floats and sometimes openings to the atmosphere, all of which are prone to malfunction. Also, the use of such mechanisms as mechanical switches, seals, and three-way valves require that the mechanisms be packaged in the filler pipe or tank assembly and that they be activated by either removing the filler cap or inserting a fuel nozzle. Thus, in order to prevent unnecessary complications and breakdowns in the vapor recovery system, it is desirable to simplify the actuation of the fuel vapor control valve. The present invention intends to simplify and improve upon the complexities presented by current control valves.

DISCLOSURE OF THE INVENTION

In view of the above, and in accordance with the present invention, there is provided a reliable apparatus for controlling the routing of fuel vapor in an automotive fuel vapor recovery system. The objectives of this invention are achieved through the application of the venturi principle, wherein it is known that the flow of fluid over a hole will cause air to be drawn into the fluid stream which in turn creates a low pressure zone or vacuum at the air inlet or hole. When the air inlet is extended in the form of a tube and connected to a control means, the low pressure zone can, effectively, act on the control means to signal the event of fluid flow. Thus, the venturi principle is utilized to signal the occurrence of a refueling event and activate the control means.

Specifically, the present invention comprises the use of at least one venturi device, alone or in combination with a check valve and/or a head valve to provide a vacuum or low pressure signal to a diaphragm actuated control valve during the act of refueling a motor vehicle equipped with an on-board refueling vapor recovery system. The venturi is preferably located in a vent line extending from a port positioned in the fuel tank, which corresponds to the designated fill level of the tank to a second port positioned on the filler neck which is proximate the fuel nozzle during refueling. A vacuum will be created at the second port of the vent line when fuel is dispensed from the fuel nozzle, causing a pressure differential in the vent line extending between the tank port and the filler neck port. Fuel vapor thus flows from the tank to the filler neck via the vent line as a result of the pressure differential. The venturi which is located in the vent line includes a signal port. As vapor flows through the venturi a vacuum is created at the signal port. Since the signal port is in communication with a control valve via a signal line extending therebetween, the venturi will provide a vacuum or low pressure signal to the control valve as vapor flows through the venturi. The greater the difference between the vapor pressure in the fuel tank and the vapor pressure at the filler neck port, the higher the flow rate through the venturi and the stronger the vacuum signal from the venturi to the control valve.

It is an object of the present invention to provide a means for creating a signal to the control valve of a vapor recovery system that is capable of operating, during the refueling of a motor vehicle, at regular fuel flow rates as well as low fuel flow rates.

It is yet another object of the present invention to provide a means for creating an actuating signal at a control valve which is free from mechanical components and therefore free from the potential for failure common to such mechanical components.

A better understanding of the invention is possible upon review of the following detailed description of the preferred embodiments with reference to the accompanying drawings.

BRIEF DESCRIPTION OF THE DRAWINGS

FIG. 1 is a diagrammatic view of the present invention as utilized with an automotive fuel system;

FIG. 2 is a diagrammatic view of an alternative embodiment of the present invention as utilized with an automotive fuel system;

FIG. 3 is a diagrammatic view of a second alternative embodiment of the present invention as utilized with an automotive fuel system;

FIG. 4 is a sectional view of a venturi component intended for use with the present invention;

FIG. 5 is an elevated view of the venturi component of FIG. 4;

FIG. 6 is a sectional view of a head valve utilized with the embodiments shown in FIGS. 2 and 3 of the present invention;

FIG. 7 is an elevated view of the head valve of FIG. 6;

FIG. 8 is a sectional view of a check valve as utilized with the alternative embodiment shown in FIG. 3 of the present invention;

FIG. 9 is an elevated view of the check valve of FIG. 8.

DETAILED DESCRIPTION OF THE PREFERRED EMBODIMENTS

The present invention provides an apparatus and method for controlling the routing of fuel vapor in an automotive fuel vapor recovery system. The invention utilizes the venturi principle by which the flow of a fluid, such as a liquid or vapor, over an orifice will cause air to be drawn into the flowing fluid stream which in turn will create a low pressure zone or vacuum at the air inlet or hole. When the orifice or air inlet is extended in the form of a tube or vent line and engaged with a control means, the low pressure zone becomes a signal and operationally acts on the control means. Although the invention is most useful in signalling the occurrence of a refueling event and activating fuel vapor flow from the tank to a storage canister, it is also adaptable to facilitate fuel vapor recovery during running loss operations. Generally, the control valve is a diaphragm actuated valve and a pressure change or signal to the diaphragm actuated control valve will signal the activation of an on-board refuel vapor recovery system such as that shown in co-pending application Ser. No. 713,402.

This invention will be described, with reference to the accompanying drawings, in a variety of embodiments which utilize a fluid flowing over an orifice to create a low pressure zone which activates the control valve of a vapor recovery system. The use of a venturi-type device in a variety of applications can enhance the performance of the present invention.

Referring now to FIG. 1, the basic embodiment of the present invention is shown as a fuel system 10 having a filler pipe 12 and a fuel tank 14. The mouth 16 of the filler pipe 12 is conventionally designed to accept a commercial fuel nozzle. Preferably, the mouth 16 will incorporate a liquid seal cartridge having an appropriately designed nozzle seal similar to that discussed in detail in co-pending application Ser. No. 713,402. A single vent line 18 is in communication between a filler pipe vent port 20 and a tank vent port 22. A venturi 24 similar to that shown in FIGS. 4 and 5 is incorporated into the vent line 18. The venturi includes a venturi signal port 26 which is in communication by means of a signal line 28 with the signal port 30 of a control valve 32. The control valve 32 is of conventional design and is utilized to vent the buildup in vapor pressure from the fuel tank 14. The control valve 32 has an exhaust port 34 which, in most cases, is in communication with a storage canister (not shown). The control valve 32 is designed to normally maintain a closed position, preventing the venting of fuel vapor, when the pressures at the filler pipe vent port 20, the tank vent port 22, and the signal port 30 are equal. This equalization of pressure normally occurs when the mouth 16 of the filler pipe 12 is sealed. During the act of refueling when the filler pipe 12 is unsealed, liquid fuel flows through the liquid seal cartridge (not shown) located in the mouth 16 of the filler pipe 12 creating a vacuum or negative pressure at the filler pipe vent port 20. As the fuel flows into the fuel tank 14, pressure builds within the fuel tank causing a positive pressure at the tank vent port 22. The differential in pressure between the tank vent port 22 and the filler pipe vent port 20 causes positive vapor flow through the vent line 18 from the tank vent port 22 to the filler pipe vent port 20. This vapor flow through the vent line 18 will continue until the tank vent port 22 is submersed in liquid fuel, at which time a pressure sensitive automatic shutoff mechanism located in the fuel nozzle discontinues the flow of fuel into the fuel tank because the air or vapor flow past the nozzle is blocked by the liquid seal. However, during the act of refueling, when the tank vent port 22 is not submersed, there is a positive pressure flow through the vent line 18 and venturi 24. The greater the difference between the vapor pressure at the tank vent port 22 and the vapor pressure at the filler pipe vent port 20, the higher the flow rate through the venturi 24. Further, as the vapor flows through the venturi 24, the neck down 25 in the venturi 24 will act to increase the vapor flow rate, thus assisting the creation of a negative pressure at the venturi signal port 26 which, in turn, acts on the signal port 30 of the control valve 32 to activate the fuel vapor recovery system.

It should be noted that, during maximum fuel flow rates into the fuel tank 14, the method described herein for signalling the control valve 32 may not require the use of a venturi 32 to create the low pressure or vacuum signal at the control valve 32. The greater the rate of fuel flow, the greater the pressure differential between the filler pipe port 20 and the tank vent port 22, and the greater the rate of vapor flow through the vent line 18 which in turn creates the negative pressure or vacuum at the signal port 30. However, if a venturi 24 is not used and the rate of fuel flow into the fuel tank 14 is minimized or decreased, the pressure differential between the filler pipe port 20 and the tank vent port 22 will also be minimized or decreased and may fail to create a enough negative pressure at the signal port 30 to activate the control valve 32. Thus, by incorporating the venturi 24 or throttled tube such as that shown in FIGS. 4 and 5 into the vent line 18, a vacuum sufficient to activate the control valve 32 will be established, even at low fuel flow rates, since the venturi 24 will act to speed up the flow rate of the vapor passing through the vent line 18, thereby creating the required drop in pressure at the venturi signal port 26.

Referring now to FIG. 2, an alternative embodiment of the invention as utilized in FIg. 1 is shown. The fuel system 10 of FIG. 2 includes the same basic components as the fuel system of FIG. 1. A filler pipe 12 is in communication with a fuel tank 14. The mouth 16 of the filler pipe is generally designed to include a liquid seal cartridge incorporating a nozzle seal (not shown). A vent line 18 extends between a filler pipe vent port 20 and a tank vent port 22. The vent line 18 includes a venturi 24 having a venturi signal port 26. The venturi signal port 26 is in communication with the signal port 30 of a control valve 32 through a signal line 28. This basic design further incorporates a head valve 36, similar to that shown in FIGS. 6 and 7, into the vent line 18. The head valve 36 is intended to assist in creating a pressure differential between the filler pipe vent port 20 and tank vent port 22 during low fuel flow rates from the fuel nozzle. For instance, it is well-known that low fuel flow rates may create an insufficient specific pressure differential between the filler pipe vent port 20 and the tank vent port 22 and, therefore, fail to create an appropriately lower pressure or vacuum at the venturi signal port 26, resulting in the concomitant failure to create an appropriate signal to the control valve 32. The head valve 36 is designed to assist in restricting the vapor flow within the vent line 18 from the tank vent port 22 to the filler pipe vent port 20 during these insufficient fuel flow rates. Restriction of the vapor flow will assist in creating a greater pressure differential between the venturi signal port 26 and the filler pipe vent port 20 at the venturi signal port, thereby providing a sufficiently strong signal to the control valve 32.

Referring now to FIG. 6, a preferred embodiment of the head valve 36 is shown. The head valve 36 includes a housing 31 defining a flow path 33 therethrough. Positioned in the flow path 33 is a chamber 35 housing a stopper 37 which is normally biased against a seat 39 by a resilient member or spring 41. The spring 41 is designed to exert a predetermined and specified force against the stopper 37. A small diameter orifice 43 extends through the stopper 37 and acts as an outlet to drain any fuel or fluid carried by the vent line 18 into the tank 14. At regular or maximum fuel flow rates, the vapor pressure or flow at the tank vent port 22 is sufficiently large to apply a force against the stopper 37 in opposition to the bias of the spring member 41 that the stopper 37 is moved off the seat 39 allowing vapor flow to continue through the vent line 18 and venturi 24, thereby creating the desired low pressure signal at the venturi signal port 26.

Referring now to FIG. 3, a second alternative embodiment of the present invention is shown. This embodiment incorporates many of the same features of FIG. 1, but is intended for use in maintaining a sufficiently strong low pressure or vacuum signal to the control valve 32 while also providing sufficient vapor flow past the aspirator of a fuel nozzle to prevent triggering the automatic shut-off mechanism of the fuel nozzle. The embodiment of FIG. 3 includes the use of two venturi, a head valve similar to that used in the embodiment of FIG. 2, and a check valve similar to that shown in FIGS. 8 and 9. The fuel system 10 includes a filler pipe 12 having a mouth 16 which preferably incorporates a liquid seal cartridge (not shown). The filler pipe 12 is engaged with the fuel tank 14. A vent line 18 extends between the filler pipe vent port 20 and the tank vent port 22. The vent line 18 includes a venturi 24 and a head valve 36. A signal line 28 is in communication between the venturi signal port 26 and the signal port 30 of the control valve 32. The signal line 28 in this embodiment includes a check valve 38 similar to that shown in FIGS. 8 and 9. Referring to FIG. 8, the preferred embodiment of the check valve 38 is shown. The check valve 38 includes a housing 51 defining a flow path 53 therethrough. Positioned in the flow path 53 is a chamber 55 housing a stopper 57 which is normally resting against a seat 59 to prevent vapor flow through the flow path 53. During a low flow or trickle refueling operation the pressure at the venturi signal port 26 is generally greater than the pressure at the signal port 30 of the control valve 32 and this pressure differential operates to maintain the stopper 57 seated against seat 59. If the pressure at the venturi signal port 26 is lower than the pressure at signal port 30, the stopper 57 will shift away from the seat 59 and allow vapor flow therethrough. The stopper 57 will engage the ribs 61 located in the chamber 55 to prevent the stopper 57 from engaging the shoulder 63 of the chamber 55 opposed to the seat 59. A second vent line 40 is also in communication between the filler pipe vent port 20 and the tank vent port 22. The second vent line includes a second venturi 42 which in turn has a signal port 44 in communication with the signal port 30 of the control valve 34 through a second signal line 128. The second venturi 42 is preferably sized to be one-half the diameter of the first venturi 24.

The embodiment shown in FIG. 3 operates as follows: During the start-up of the act of refueling or during trickle flow rates, the head valve 36 and the check valve 38 are normally closed, preventing any vapor flow through vent line 18. The only vapor flow will occur through the second vent line 40. As vapor flows through the second vent line 40, it has a minimal flow rate due to the low refueling flow rate. However, the smaller diameter venturi 42 will operate to create a vacuum or low pressure signal at the signal port 44 and, concomitantly, at the signal port 30 of the control valve 32. Even though the trickle flow rate creates a minimal pressure differential and vapor flow rate between the tank vent port 22 and the filler pipe vent port 20, through the second vent line 40, the smaller diameter venturi 42 will maximize the vapor flow rate and assist in creating a sufficient low pressure or vacuum signal at the control valve 32. As the refueling rate increases to a normal flow rate, the smaller diameter venturi 42 will be insufficiently sized to handle the necessary volume of vapor flow, thus creating a pressure buildup in the tank 14 and creating a suction or low pressure vacuum in the vent line 18 and the second vent line 40. As the low pressure in vent line 18 builds and as the pressure in the tank 14 builds, the bias of the spring 41 of the head valve 36 is overcome and the head valve 36 will open to permit vapor flow through the main vent line 18. The venturi 24 in the main vent line 18 will then operate, as previously described, to create a vacuum or low pressure signal at the signal port 44, forcing the check valve 38 to open and create a signal at the signal port 30 of the control valve 32. Thus, during normal flow rates, vapor is transferred from the tank vent port 22 to the filler pipe vent port 20 through both the first vent line 18 and the second vent line 40, thereby creating sufficient vapor flow past the aspiration of the fuel nozzle to keep the automatic shut-off open and also to create a sufficient low pressure signal at the control valve 32 to operate the control valve 32.

The above described embodiments of the present invention are intended to be illustrative in nature and are not intended to be limiting upon the scope and content of the following claims.

I claim:

1. An apparatus for controlling the flow of fuel vapor within a motor vehicle fuel system that includes a fuel storage tank and a filler pipe in fluid engagement with the tank and having a mouth for receiving a fuel nozzle during the act of refueling comprising:

a control valve capable of venting fuel vapor from a tank and adapted to be positioned on the tank and extend into the interior of the tank;

a vent line in fluid engagement with the tank and adapted to extend to a position of fluid engagement with the filler pipe at a location proximate the mouth of the filler pipe;

a venturi member positioned in said vent line and having a signal port; and a signal line in communication with said signal port and extending to a position of fluid engagement with said control valve, whereby the flow of fuel into the filler pipe creates a pressure differential between the tank and the filler pipe mouth and fuel vapor flows through said vent line and venturi from the tank to the filler pipe and the flow of fuel vapor past said signal port creates low pressure or a vacuum in said signal line, such low pressure or vacuum acting on said control valve.

2. The apparatus of claim 1 further including a means for interrupting the flow of fuel vapor through said vent line, thus creating a low pressure or vacuum at said signal port and further creating of build-up of vapor pressure in the tank.

3. The apparatus of claim 2, wherein said means for interrupting the flow of fuel vapor comprises a head valve having a stopper and a resilient means having said stopper to the closed position, to prevent vapor flow through said head valve, with a predetermined force wherein the vapor pressure in the tank builds to a level that applies a force against said stopper greater than the predetermined force and opens said stopper to permit vapor flow through said vent line.

4. An apparatus for controlling the flow of fuel vapor within a motor vehicle system that includes a fuel storage tank and a filler pipe in fluid engagement with the tank and having a mouth for receiving a fuel nozzle, housing a pressure activated automatic shut-off aspirator, during the act of refueling comprising:
 a control valve capable of venting fuel vapor from a tank and adapted to be positioned on the tank and extend into the interior of the tank;
 a first vent line in fluid engagement with the tank and extending to a position of fluid engagement with the filler pipe at a location proximate the mouth of the filler pipe;
 a first venturi member positioned in said vent line and having a signal port; and
 a first signal line in fluid communication with said signal port and extending to a position of fluid engagement with said control valve, whereby the flow of fuel into the filler pipe creates a pressure differential between the tank and the filler pipe mouth and fuel vapor flows through said vent line and venturi from the tank to the filler pipe and the flow of fuel vapor past the automatic shut-off aspirator causes the fuel nozzle to remain operational and further creates low pressure or a vacuum in said signal line, such low pressure or vacuum acting on said control valve.

5. The apparatus of claim 4 further including a means for maintaining the low pressure or vacuum in said signal line and the flow of fuel vapor past the automatic shut-off aspirator during low fuel flow rates from the fuel nozzle.

6. The apparatus of claim 4 further including a second vent line in fluid communication between the tank and the mouth of the filler pipe, said second vent line including a second venturi member of smaller diameter than said first venturi member and having a second signal port, said second signal port being in fluid communication with said control valve via a second signal line and a means for interrupting the flow of fuel vapor through said first vent line, wherein at low fuel flow rates fuel vapor flows through said second vent line and second venturi member from the tank to the filler pipe creating a low pressure or vacuum in said second signal line, such low pressure or vacuum acting on said control valve.

7. The apparatus of claim 6, wherein said means for interrupting the flow of fuel vapor through said first vent line comprises a valve member normally biased closed and designed to open when the fuel flow rate from the refueling nozzle reaches the standard or maximum flow rate.

8. The apparatus of claim 7, wherein said valve member includes a stopper and a resilient means biasing said stopper to the closed position to prevent vapor flow through said valve member, with a predetermined force wherein the vapor pressure in the tank builds to a level that applies a force against said stopper greater than the predetermined force and opens said stopper to permit vapor flow through said first vent line.

9. The apparatus of claim 8 further including a check valve means located in said first signal line, said check valve means being normally biased to the closed position and opening only when said valve member opens to permit vapor flow through said first vent line.

* * * * *